(12) United States Patent
Morioka et al.

(10) Patent No.: US 8,874,100 B2
(45) Date of Patent: Oct. 28, 2014

(54) MOBILE COMMUNICATION METHOD AND RELAY NODE

(75) Inventors: Yasufumi Morioka, Tokyo (JP); Hideaki Takahashi, Tokyo (JP); Yukihiko Okumura, Tokyo (JP); Mikio Iwamura, Tokyo (JP); Akira Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 58 days.

(21) Appl. No.: 13/805,680

(22) PCT Filed: Jun. 22, 2011

(86) PCT No.: PCT/JP2011/064250
§ 371 (c)(1),
(2), (4) Date: Jan. 28, 2013

(87) PCT Pub. No.: WO2011/162289
PCT Pub. Date: Dec. 29, 2011

(65) Prior Publication Data
US 2013/0122892 A1    May 16, 2013

(30) Foreign Application Priority Data
Jun. 24, 2010  (JP) .................................. 2010-144318

(51) Int. Cl.
*H04W 4/00* (2009.01)
*H04W 88/04* (2009.01)
*H04B 7/155* (2006.01)
*H04W 76/06* (2009.01)
*H04W 84/04* (2009.01)

(52) U.S. Cl.
CPC ............... *H04W 88/04* (2013.01); *H04B 7/155* (2013.01); *H04W 84/047* (2013.01); *H04W 76/06* (2013.01)
USPC ............ 455/422.1; 455/7; 455/572; 455/561; 370/311; 370/338

(58) Field of Classification Search
CPC ... H04W 88/04; H04W 76/046; H04B 7/2606
USPC .................... 455/7, 9, 422.1–425, 572–574, 455/560–562.1, 466, 13.1; 370/315, 311, 370/328, 338
See application file for complete search history.

(56) References Cited

U.S. PATENT DOCUMENTS

| | | | | |
|---|---|---|---|---|
| 5,812,528 A | * | 9/1998 | VanDervort | 370/235 |
| 6,069,947 A | * | 5/2000 | Evans et al. | 379/229 |
| 6,167,028 A | * | 12/2000 | Harris | 370/230 |

(Continued)

OTHER PUBLICATIONS

International Search Report w/translation from PCT/JP2011/064250 mailed on Aug. 30, 2011 (2 pages).

(Continued)

*Primary Examiner* — Sharad Rampuria
(74) *Attorney, Agent, or Firm* — Osha Liang LLP

(57) ABSTRACT

A mobile communication method according to the present invention includes a step in which, when a relay node RN, which is subordinate to a radio base station DeNB and is in an "RRC_CONNECTED state", received an "RRC connection release message" from the radio base station DeNB, the relay node RN is transitioned to an "RRC_IDLE state" after transmitting an "RRC connection release message" to a mobile station UE, which is subordinate to the relay node RN and is in the "RRC_CONNECTED state", and a predetermined time T2 elapses.

2 Claims, 3 Drawing Sheets

(56) References Cited

U.S. PATENT DOCUMENTS

| | | | |
|---|---|---|---|
| 7,496,100 B2* | 2/2009 | Kawai et al. | 370/395.5 |
| 8,639,207 B2* | 1/2014 | Tsunoda | 455/343.1 |
| 2007/0025342 A1* | 2/2007 | Obata | 370/352 |
| 2009/0036050 A1* | 2/2009 | Min et al. | 455/7 |
| 2010/0046418 A1* | 2/2010 | Horn et al. | 370/315 |
| 2010/0103845 A1* | 4/2010 | Ulupinar et al. | 370/254 |
| 2010/0323614 A1* | 12/2010 | Yu et al. | 455/9 |
| 2011/0051655 A1* | 3/2011 | Blankenship et al. | 370/315 |

OTHER PUBLICATIONS

Written Opinion of the International Searching Authority PCT/JP2011/064250 mailed on Aug. 30, 2011 (3 pages).

Catt; "Control Plane for Un interface"; 3GPP TSG-RAN WG2 meeting #68bis, R2-100176; Valencia, Spain; Jan. 18-22, 2010 (3 pages).

Ericsson; "Details on the RRC Connection Release procedure"; 3GPP TSG-RAN WG2 #60bis, R2-080250; Sevilla, Spain; Jan. 14-18, 2008 (9 pages).

3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (34 pages).

3GPP TS 36.413 V9.3.0; "3rd Generation Partnership Project; Technical Specification Group Radio Access Network; Evolved Universal Terrestrial Radio Access Network (E-UTRAN); S1 Application Protocol (S1AP) (Release 9)"; Jun. 2010 (240 pages).

3GPP TS 36.331 V9.3.0; "3rd Generation Partnership Project; Technical Specification Group Radio Access Network; Evolved Universal Terrestrial Radio Access (E-UTRA); Radio Resource Control (RRC); Protocol specification (Release 9)", Jun. 2010 (250 pages).

* cited by examiner

MOBILE COMMUNICATION METHOD AND RELAY NODE

TECHNICAL FIELD

The present invention relates to a mobile communication method and a relay node.

BACKGROUND ART

In an LTE (Long Term Evolution)-Advanced scheme, it is possible to use a relay node RN connectable to a radio base station DeNB (Doner eNB) through a Un interface.

CITATION LIST

Non Patent Literature

[NPL 1] 3GPP TR36.806 (V9.0.0), "Evolved Universal Terrestrial Radio Access (E-UTRA); Relay architectures for E-UTRA (LTE-Advanced) (Release.9)", March, 2010
[NPL 2] 3GPP TS36.413 (V9.3.0), "Evolved Universal Terrestrial Radio Access Network (E-UTRAN); S1 application protocol (S1AP)", June, 2010
[NPL 3] 3GPP TS36.331 (V9.3.0), "Radio Resource Control (RRC); Protocol specification", June, 2010

SUMMARY OF INVENTION

Technical Problem

The relay node RN is subordinate to the radio base station DeNB and configured to be able to be transitioned between an "RRC_IDLE state" and an "RRC_CONNECTED state".

Furthermore, a mobile station UE is subordinate to the relay node RN and configured to be able to be transitioned between an "RRC_IDLE state" and an "RRC_CONNECTED state".

However, the LTE-Advanced scheme has a problem that when the relay node RN which is subordinate to the radio base station DeNB and is in the "RRC_CONNECTED state", is transitioned to the "RRC_IDLE state", a trigger for stopping transmission in an access line (an RN-Uu interface) toward the mobile station UE is not set forth.

Therefore, the present invention has been achieved in view of the above-described problems, and an object thereof is to provide a mobile communication method and a relay node, with which it is possible to cause a mobile station UE which is subordinate to the relay node RN and is in the "RRC_CONNECTED state", to be transitioned to the "RRC_IDLE state" without delay, when a relay node RN which is subordinate to the radio base station DeNB and is in the "RRC_CONNECTED state", is transitioned to the "RRC_IDLE state".

Solution to Problem

A first characteristic of the present invention is summarized in that a mobile communication method includes: a step A of transmitting, by a radio base station, a first connection release message to a relay node which is subordinate to the radio base station and is in a connected state; a step B of transmitting, by the relay node, a second connection release message to a mobile station which is subordinate to the relay node and is in the connected state, when the first connection release message was received; a step C in which when the second connection release message was received, the mobile station is transitioned to an idle state; and a step D in which after the second connection release message is transmitted and a predetermined period elapses, the relay node is transitioned to the idle state.

A second characteristic of the present invention is summarized in that a relay node includes: a transmission unit configured to transmit a second connection release message to a mobile station which is subordinate to the relay node and is in a connected state", when the relay node is subordinate to a radio base station and is in the connected state, and a first connection release message was received from the radio base station; and a control unit configured to cause the relay node to be transitioned to an idle state after the second connection release message is transmitted and a predetermined period elapses.

Advantageous Effects of Invention

As described above, according to the present invention, it is possible to provide a mobile communication method and a relay node, with which it is possible to cause a mobile station UE which is subordinate to the relay node RN and is in the "RRC_CONNECTED state", to be transitioned to the "RRC_IDLE state" without delay, when a relay node RN which is subordinate to a radio base station DeNB and is in an "RRC_CONNECTED state", is transitioned to an "RRC_IDLE state".

DESCRIPTION OF EMBODIMENTS

Mobile Communication System According to First Embodiment of the Present Invention With reference to FIG. 1 through FIG. 4, a mobile communication system according to a first embodiment of the present invention will be described.

Figure 1:
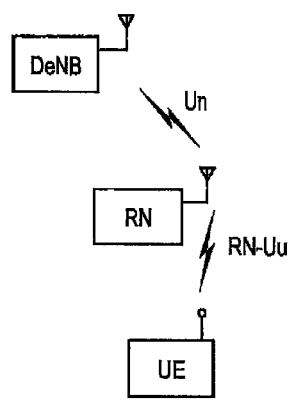
FIG. 1 is a diagram showing the entire configuration of a mobile communication system according to a first embodiment of the present invention.

The mobile communication system according to the present embodiment is an LTE-Advanced mobile communication system, and includes a radio base station DeNB and a relay node RN as illustrated in FIG. 1.

Figure 2:
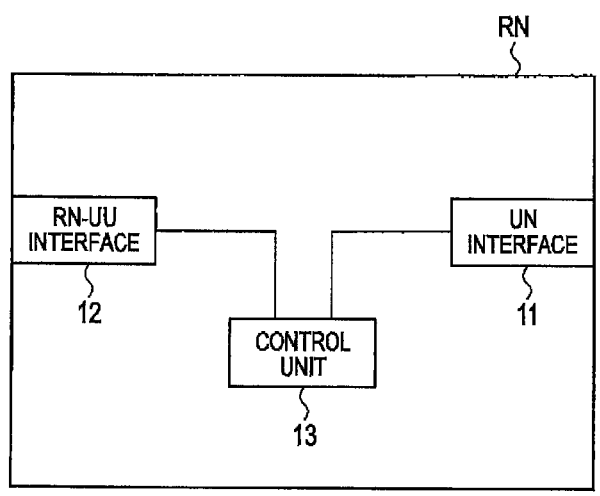
FIG. 2 is a functional block diagram of a relay node according to the first embodiment of the present invention.

As illustrated in FIG. 2, the relay node RN includes a Un interface 11, an RN-Uu interface 12, and a control unit 13.

The Un interface 11 is configured to serve as an interface between the relay node RN and the radio base station DeNB.

The RN-Uu interface 12 is configured to serve as an interface between the relay node RN and a mobile station UE.

The control unit 13 is configured to control to transmit/receive a signal between the relay node RN and the radio base station DeNB through the Un interface 11, and a signal between the relay node RN and the mobile station UE through the RN-Uu interface 12.

Furthermore, the control unit 13 is configured to cause the relay node RN subordinate to the radio base station DeNB to be transitioned between an "RRC_IDLE state" and an "RRC_CONNECTED state".

For example, when the relay node RN is subordinate to the radio base station DeNB and is in the "RRC_CONNECTED state" and received an "RRC connection release message" transmitted by the radio base station DeNB, the control unit 13 is configured to instruct the RN-Uu interface 12 to transmit an "RRC connection release message" to the mobile station UE which is subordinate to the relay node RN and is in the "RRC_CONNECTED state", and to cause the relay node RN to be transitioned to the "RRC_IDLE state" after the "RRC connection release message" is transmitted by the RN-Un interface 12 and a predetermined period elapses.

For example, in the case in which the "RRC connection release message" was transmitted by the RN-Uu interface 12, the control unit 13 may be configured to activate a predetermined timer, and cause the relay node RN to be transitioned to the "RRC_IDLE state" when the predetermined timer was expired.

Hereinafter, with reference to FIG. 3, an example of the operation of the mobile communication system according to the first embodiment of the present invention will be described.

Figure 3:
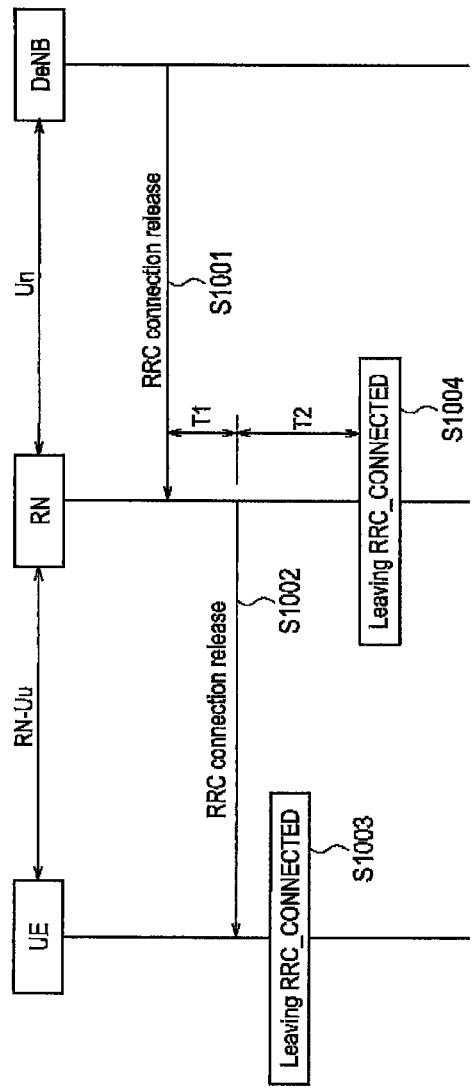
FIG. 3 is a sequence diagram showing the operation of the mobile communication system according to the first embodiment of the present invention.

As illustrated in FIG. 3, in step S1001, the radio base station DeNB transmits an "RRC connection release message" to the relay node RN which is subordinate to the radio base station DeNB and is in an "RRC_CONNECTED state".

After the "RRC connection release message" is received and a time T1 elapses, the relay node RN transmits an "RRC connection release message" to the mobile station UE which is subordinate to the relay node RN and is in the "RRC_CONNECTED state" in step S1002.

Furthermore, for example, the time T1 may be the shortest time for which it is possible for the relay node RN to transmit a signal, which was received through the Un interface 11, through the RN-Un interface 12.

When the "RRC connection release message" is received, the mobile station UE performs a "Leaving RRC_CONNECTED procedure" to be transitioned to the "RRC_IDLE state" in step S1003.

Meanwhile, after the "RRC connection release message" is transmitted and a time T2 elapses, the relay node RN performs the "Leaving RRC_CONNECTED procedure" to be transitioned to the "RRC_IDLE state".

Furthermore, for example, the time T2 may be a time from the activation to the expiration of the predetermined timer.

Next, with reference to FIG. 4, an example of the operation of the relay node RN according to the first embodiment of the present invention will be described.

Figure 4:
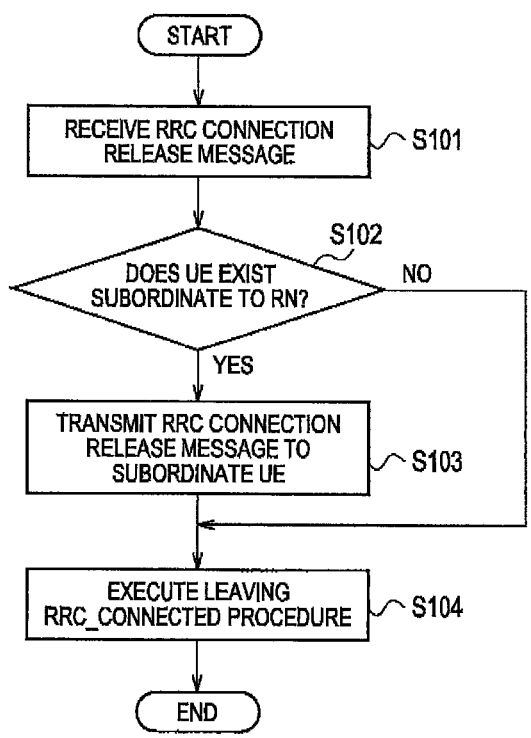
FIG. 4 is a flowchart showing an operation of the relay node according to the first embodiment of the present invention.

As illustrated in FIG. 4, when the relay node RN, which is subordinate to the radio base station DeNB and is in an "RRC_CONNECTED state", receives an "RRC connection release message" from the radio base station DeNB in step S101, the relay node RN determines the presence or absence of the mobile station UE which is subordinate to the relay node RN and is in the "RRC_CONNECTED state" in step S102.

In the case of "YES", the present operation proceeds to step S103. In the case of "NO", the present operation proceeds to step S104.

In the step S103, the relay node RN transmits an "RRC connection release message" to the mobile station UE which is subordinate to the relay node RN and is in the "RRC_CONNECTED state" after the "RRC connection release message" is received and the time T1 elapses.

In the step S104, the relay node RN performs a "Leaving RRC_CONNECTED procedure" to be transitioned to the "RRC_IDLE state" after the "RRC connection release message" is transmitted and the time T2 elapses.

However, in the case of "NO" in the step S102, the relay node RN may perform the "Leaving RRC_CONNECTED procedure" to be transitioned to the "RRC_IDLE state" after the "RRC connection release message" is transmitted and the time T1 elapses, in the step S104.

Furthermore, in the case in which the relay node RN, which is subordinate to the radio base station DeNB and is in the "RRC_CONNECTED state", received the "RRC connection release message" from the radio base station DeNB, when transmission in the RN-Uu interface is immediately stopped, since the mobile station UE, which is subordinate to the relay node RN and is in the "RRC_CONNECTED state", detects RLF (Radio Link Failure), it is probable that a time is required until the relay node RN is transitioned to the "RRC_IDLE state".

In this regard, in the mobile communication system according to the present embodiment, when the relay node RN, which is subordinate to the radio base station DeNB and is in the "RRC_CONNECTED state", received the "RRC connection release message" from the radio base station DeNB, the relay node RN is configured to be transitioned to the "RRC_IDLE state" after causing the mobile station UE, which is subordinate to the relay node RN and is in the "RRC_CONNECTED state", to be transitioned to the "RRC_IDLE state".

Consequently, in the mobile communication system according to the present embodiment, it is possible to shorten a time until the mobile station UE, which is subordinate to the relay node RN and is in the "RRC_CONNECTED state", is transitioned to the "RRC_IDLE state".

The characteristics of the present embodiment as described above may be expressed as follows.

A first characteristic of the present embodiment is summarized in that a mobile communication method includes: a step A of transmitting, by a radio base station DeNB, an "RRC connection release message (a first connection release message)" to a relay node RN which is subordinate to the radio base station DeNB and is in an "RRC_CONNECTED state (a connected state)"; a step B of transmitting, by the relay node RN, an "RRC connection release message (a second connection release message)" to a mobile station UE, which is subordinate to the relay node RN and is in the "RRC_CONNECTED state" when the "RRC connection release message" was received; a step C in which when the "RRC connection release message" was received, the mobile station UE is transitioned to an "RRC_IDLE state (an idle state)"; and a step D in which after the "RRC connection release message" is transmitted and a predetermined time T2 elapses, the relay node RN is transitioned to the "RRC_IDLE state".

In the first characteristic of the present embodiment, in the step B, when the "RRC connection release message" is transmitted, the relay node RN may activate a predetermined timer, and in the step D, when the predetermined timer is expired, the relay node RN may be transitioned to the "RRC_IDLE state".

A second characteristic of the present embodiment is summarized in that a relay node RN includes: an RN-Uu interface 12 (transmission unit) configured to transmit an "RRC connection release message" to a mobile station UE, which is subordinate to the relay node RN and is in an "RRC_CONNECTED state" when the relay node RN is subordinate to a radio base station DeNB and is in the "RRC_CONNECTED state", and an "RRC connection release message" was received from the radio base station DeNB; and a control unit 13 configured to cause the relay node RN to be transitioned to an "RRC_IDLE state" after the "RRC connection release message" is transmitted and a predetermined time T2 elapses.

In the second characteristic of the present embodiment, the control unit 13 may be configured to activate a predetermined timer when the "RRC connection release message" was transmitted, and to cause the relay node RN to be transitioned to the "RRC_IDLE state" when the predetermined timer was expired.

Note that the operation of the radio base station DeNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station DeNB, the relay node RN, or the mobile station UE. Furthermore, such a storage medium and processor may be arranged in the radio base station DeNB, the relay node RN, or the mobile station UE as discrete components.

Thus, the present invention has been explained in detail by using the above-described embodiments; however, it is obvious that for persons skilled in the art, the present invention is not limited to the embodiments explained herein. The present invention can be so implemented as a corrected and modified mode without departing the gist and the scope of the present invention defined by the claims. Therefore, the description of the specification is intended for explaining the example only and does not impose any limited meaning to the present invention.

REFERENCE SIGNS LIST

RN . . . Relay node
11 . . . Un interface
12 . . . RN-Uu interface
13 . . . Control unit

The invention claimed is:

1. A mobile communication method, comprising:
a step A of transmitting, by a radio base station, a first connection release message to a relay node which is subordinate to the radio base station and is in a connected state;
a step B of transmitting, by the relay node, a second connection release message to a mobile station which is subordinate to the relay node and is in the connected state, when the first connection release message is received;
a step C in which when the second connection release message is received, the mobile station is transitioned to an idle state; and
a step D in which after the second connection release message is transmitted and a predetermined period elapses, the relay node is transitioned to the idle state, wherein
in the step B, when the second connection release message is transmitted, the relay node activates a predetermined timer, and
in the step D, when the predetermined timer is expired, the relay node is transitioned to the idle state.

2. A relay node comprising:
a transmission unit configured to transmit a second connection release message to a mobile station which is subordinate to the relay node and is in a connected state, when the relay node is subordinate to a radio base station and is in the connected state, and a first connection release message is received from the radio base station; and
a control unit configured to cause the relay node to be transitioned to an idle state after the second connection release message is transmitted and a predetermined period elapses,
wherein the control unit is configured to activate a predetermined timer when the second connection release message is transmitted, and to cause the relay node to be transitioned to the idle state when the predetermined timer is expired.

* * * * *